United States Patent [19]

Gautier et al.

[11] Patent Number: 4,768,173
[45] Date of Patent: Aug. 30, 1988

[54] PRESSURE WAVE SENSING DEVICE OF THE PIEZOELECTRIC TYPE WITH CONTINUOUS STRUCTURE AND A METHOD OF MANUFACTURING SAME

[75] Inventors: Thierry Gautier, Melun; Claude Beauducel, Henonville, both of France

[73] Assignee: Institut Francais Du Petrole, Malmaison, France

[21] Appl. No.: 69,173

[22] Filed: Jul. 2, 1987

[30] Foreign Application Priority Data

Jul. 4, 1986 [FR] France ................................ 86 09880

[51] Int. Cl.$^4$ .............................................. G01V 1/38
[52] U.S. Cl. ...................................... 367/15; 367/159; 367/169; 310/337; 310/800
[58] Field of Search ................... 367/15, 20, 157, 159, 367/166, 169; 181/110; 310/337, 800

[56] References Cited

U.S. PATENT DOCUMENTS

3,798,474  3/1974  Cassand et al. ..................... 367/169
4,568,851  2/1986  Soni et al. ............................ 310/330

FOREIGN PATENT DOCUMENTS

0057982  8/1982  European Pat. Off. .
7417545  12/1975  France .

Primary Examiner—Charles T. Jordan
Assistant Examiner—John W. Eldred
Attorney, Agent, or Firm—Antonelli, Terry & Wands

[57] ABSTRACT

A pressure wave sensor device is provided including at least two sensitive flexible piezoelectric elements wound in two helices in opposite directions of a tubular support and a method for manufacturing same, said device including a copper conducting ribbon wound helically between the two windings of opposite direction and in the same direction as the underlying winding so as to avoid short circuits at the crossing points of the turns and to improve the electric and mechanical couplings between the two sensitive elements, said tubular support being provided with collector assemblies at regular intervals and wound over the whole of its length with the sensitive elements and the conducting ribbon, the different windings then being cut to the right length at the level of the collector assemblies and connected electrically thereto.

8 Claims, 2 Drawing Sheets

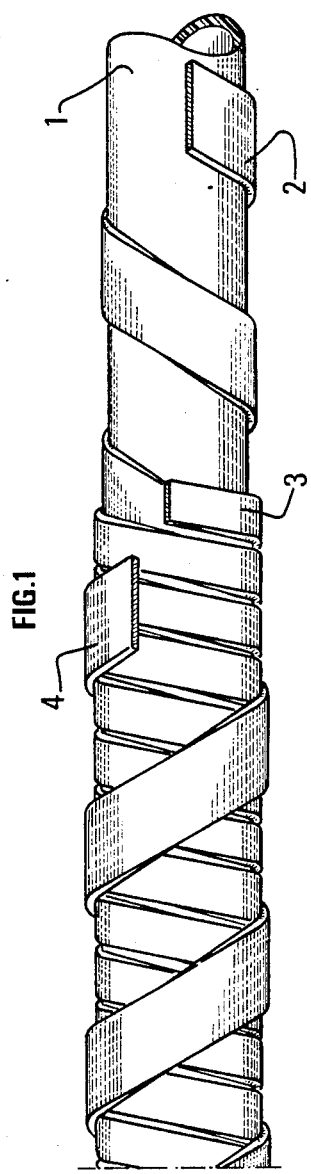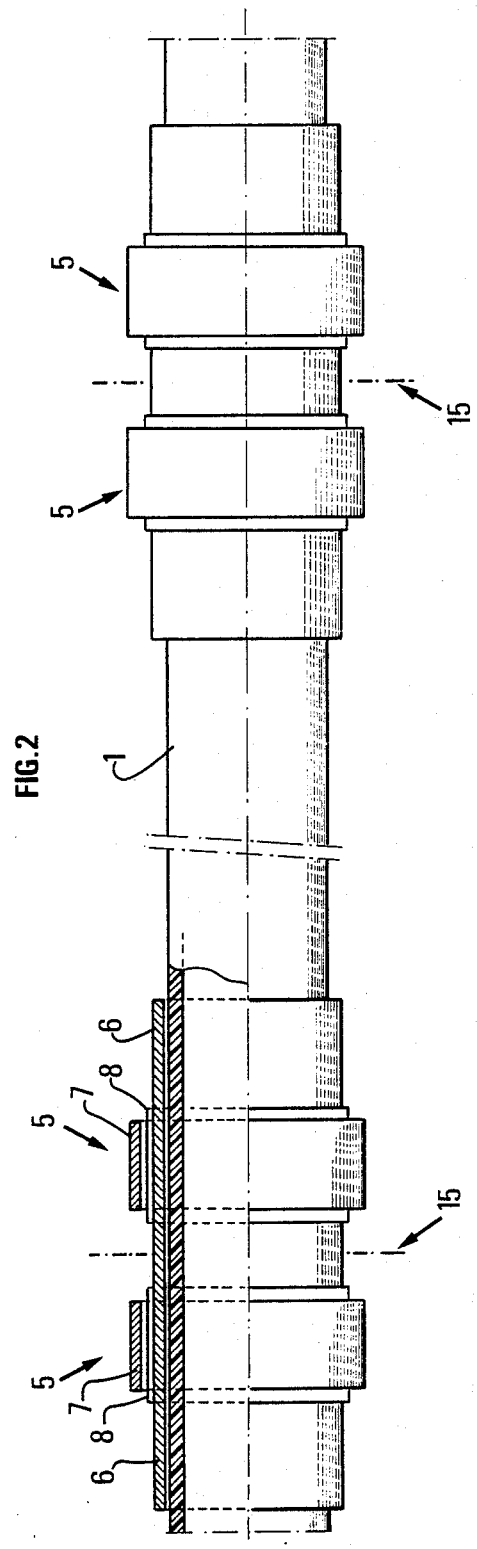

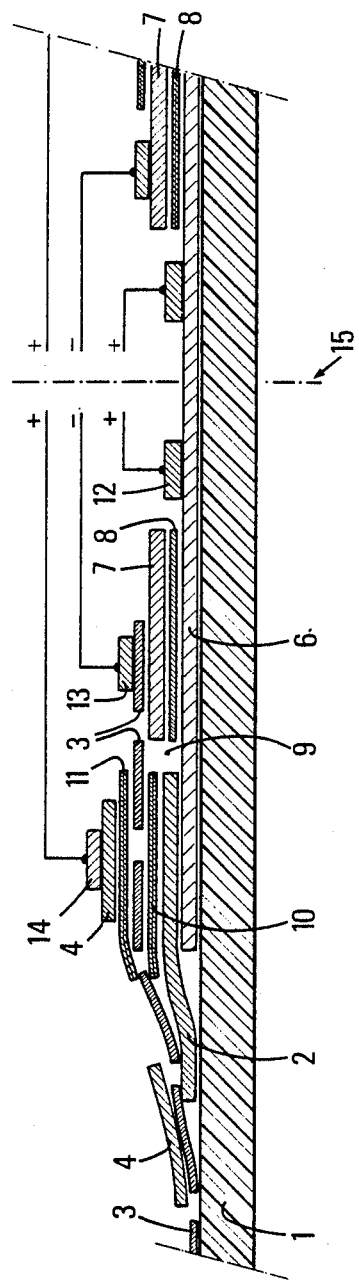
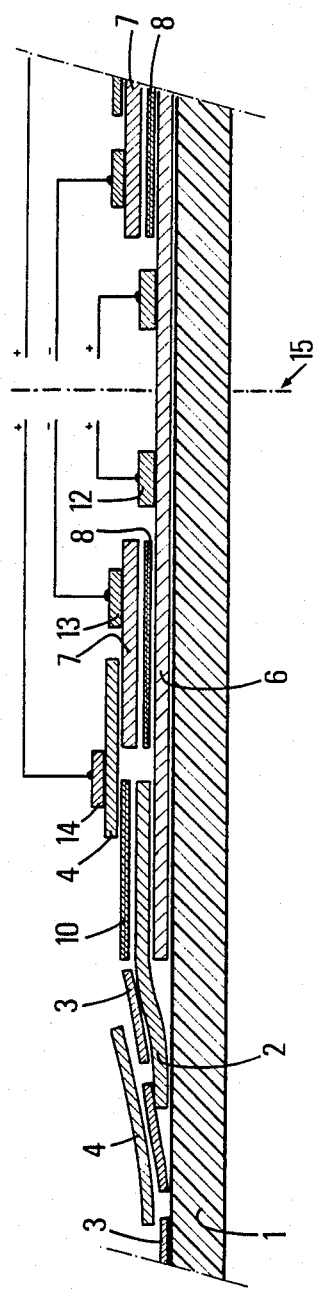

PRESSURE WAVE SENSING DEVICE OF THE PIEZOELECTRIC TYPE WITH CONTINUOUS STRUCTURE AND A METHOD OF MANUFACTURING SAME

BACKGROUND OF THE INVENTION

1. Field of the Invention

The invention relates to a pressure wave sensing device of the piezoelectric type and a method for manufacturing the same.

The device of the invention finds applications particularly in the field of seismic prospection where reception devices are used formed of a number of seismic receivers, often a high number, disposed at intervals from each other and connected to a central recording laboratory. With acoustic waves emitted into the ground, the signals which have been reflected or refracted from the different interfaces of the subsoil are picked up by this receiver array. By recording and processing the signals picked up, a set of traces is obtained representative of the configuration of the subsoil, as is well known.

Each receiver includes an elementary sensor or several sensors interconnected in series and/or in parallel for increasing their voltage and load sensitivity respectively. For marine applications, the receivers are disposed along a sealed sheath or seismic streamer towed immersed by a ship.

2. Description of the Prior Art

The sensors currently used are of the piezoelectric type. They include disks of relatively small dimensions made from a piezoelectric material and each is associated with a pair of electrodes. These disks are contained in cases having one or more faces transparent to the acoustic waves. Such sensors are described for example in the U.S. Pat. No. 3,489,995.

From French Pat. No. 2.145.099 or U.S. Pat. No. 3,798,474 a sensor device is known formed of at least one sensitive element in the form of a strip. This strip is formed of a flexible ribbon made from a piezoelectric material and two electrodes on each side of the ribbon and, more generally, several sensitive elements connected in series so as to increase the electric voltage sensitivity of the assembly. In one arrangement, a seismic receiver is formed by winding a first sensitive strip associated with its two electrodes on a cylindrical insulating core. A flexible insulating strip is superimposed on the first sensitive strip by winding. Over that is again wound a second sensitive strip in a spiral in the opposite direction to the first one. Rings in contact respectively with the electrodes of the two sensitive strips are connected by conducting wires so as to form a series interconnection.

In its practical embodiment, such an arrangement has drawbacks. The electrical connection of the electrodes of the two sensitive strips is generally provided at the ends of the support through conducting rings. Since the resistance of the conducting films forming the electrodes is not negligible, in a parallel combination of the two sensitive strips for example, the length of the electrodes may contribute to limiting the pass band of the sensor Furthermore, it does not lend itself well to industrial production to the extent that the collecting rings at each end of each receiver section are positioned in several different manufacturing steps so as to be in contact with the electrodes which correspond therewith before winding other layers.

The sensor device and the manufacturing method of the present invention avoid the above mentioned drawbacks.

SUMMARY OF THE INVENTION

The sensor device includes at least two sensitive elements each formed of a ribbon made from a synthetic plastic material having piezoelectric properties and associated with two electrodes disposed on each side of the ribbon, the two sensitive elements being superimposed on a tubular support and disposed in two crossed helical windings.

It is characterized in that it includes a flexible conducting ribbon transparent to the acoustic waves, wound in a helix and superimposed on the lower windings so as to cover the lateral edges of all its turns, the conducting ribbon forming the contact between the external electrode of the sensitive element which it covers and the internal electrode of the sensitive element which is superimposed thereon.

The device may include at least one collector assembly in electric contact with the electrodes associated with the two sensitive elements. This collector assembly includes for example a first conducting strip surrounding the tubular support and at least one second conducting strip, narrower than the first one, the two conducting strips being superimposed and separated from each other by an insulating layer, and the lower sensitive element is in contact with the widest conducting strip.

With this arrangement, a sensor device is provided having two sensitive elements connected in parallel through two electrodes being placed in electric contact. The thin conducting ribbon interposed between the two windings is transparent to the acoustic waves and therefore transmits the pressures to be measured with negligible attenuation. Because of the intimate contact that it has with the electrodes of the two sensitive elements, the mechanical deformations of the tubular support resulting from flexible for example, are also transmitted to the two sensitive elements, which facilitates the compensation of the parasitic voltages due to these deformations. Furthermore, the conducting ribbon provides perfect engagement of the electrodes facing the two sensitive elements, which reduces the electric resistance of the connections and improves the electric reliability.

Furthermore, since the electrodes of each sensitive element are of width equal to that of the piezoelectric substrate, short circuits may occur between turns at the crossing point of the two windings. By covering the edges of the lower sensitive element the conducting ribbon avoids this disadvantage.

The process which the invention also provides concerns the construction of a sensor device such as defined above.

It includes:

the use of a tubular support of great length on which, at even intervals, collecting assemblies are fixed each including a first conducting strip surrounding the tubular support, two second adjacent and disjointed conducting strips superimposed on the first strip and separated therefrom by an insulating layer, a first part of the first strip, at each of its ends, not being covered by said second conducting strip;

the helical winding, all along the tubular support, successively of the first sensitive element, of the conducting ribbon and of the second sensitive element;

cutting of the tubular element provided with its windings, in the gap between two second adjacent conducting strips;

cutting of the windings at the end of each section, so as to put the electrodes associated with the lower sensitive element in electric contact respectively with the first conducting strip and a second of the conducting strips; and fixing conducting material rings respectively about the first conducting strip, a second conducting strip and an electrode of the external sensitive element.

The method of the invention facilitates the mass production of a large number of sensors from a tubular support of great length pre-equipped with collector assemblies and provides a very good manufacturing quality.

BRIEF DESCRIPTION OF THE DRAWINGS

Other features and advantages of the device and method of the invention will be clear from reading the following description of two embodiments given by way of non limitative examples, with reference to the accompanying drawings in which:

FIG. 1 shows a tubular support and the different windings which cover it;

FIG. 2 shows a part of a tubular support with two collecting assemblies before the sensitive elements and the conducting ribbon are wound;

FIG. 3 shows schematically in section, and very much enlarged for the clarity of the description, a part of the tubular support in the vicinity of a collecting assembly and the connections which are formed between this latter and the different windings; and FIG. 4 shows a similar view of another embodiment of the device.

DESCRIPTION OF THE PREFERRED EMBODIMENTS

The sensor device includes (FIG. 1) an elongate tubular support 1 made from a plastic material sufficiently rigid for resisting crushing but sufficiently flexible to undergo flexional movements. This is necessary for numerous applications, in marine seismic prospection particularly where the sensors are disposed inside seismic streamers. They are wound on drums and, for the prospection requirements, are unwound behind a ship and towed immersed. During manoeuvering, the seismic sensors included are subjected to very different mechanical stresses. To give the seismic streamers a certain buoyancy, they are generally filled with hydrocarbons. Consequently, plastic materials resistant to hydrocarbons are chosen for constructing the tubular supports.

On the tubular support is helically wound in a first direction a sensitive element 2 of a known type including a strip of piezoelectric plastic material and two metal films serving as electrodes. The pitch for winding the sensitive elements is chosen greater than its width so as to avoid any overlapping of the turns. Thereover is wound, in the same direction, a conducting ribbon 3 formed for example of a thin copper strip The turns are adjoining or slightly spaced and the conducting ribbon is disposed with respect to the first wound sensitive element so that the conducting ribbon overlaps lateral edges of the first wound sensitive element. A second sensitive element 4 is helically wound on top of the conducting ribbon 3. The pitch between turns is identical to that of the first sensitive element 3 but the winding direction is opposite the first one. The copper strip avoids the short circuits which may occur at the intersections of two turns in opposite directions and, as has been seen, it facilitates not only mechanical but also electric coupling of the facing electrodes of the two sensitive elements.

For series production of the sensor devices, a tubular support of great length is used (from a few meters to a few tens of meters and even much more) on which collector assemblies 5 (FIG. 2) are fixed at regular intervals (1 m for example, each formed of a first metal strip or ring 6 on which are superimposed two second metal strips or rings 7. Two insulating layers 8 are interposed respectively between the first ring 6 and each of the two secondary rings. The two secondary rings are separated from each other. The width of the first ring 6 is chosen so that its two opposite end parts 9 are uncovered.

With a winding machine of known type the first sensitive element 2 is wound over the whole length of the tubular support and then, in the same direction, the conducting ribbon 3. On top is wound the second sensitive element 4. Then the tubular support is cut at the level of all the collector assemblies 5 (or of some of them depending on the length of the sensors it is desired to obtain). The cutting is effected in the median plane 15 between the two secondary rings 7. Then the windings are shortened so as to form the electric contacts shown in greater detail in FIGS. 3 and 4.

In the embodiment shown in FIG. 3, the first sensitive element 2 is cut so that the lower electrode with is last turn comes to bear against the uncovered part 9 of the first ring 6 (FIG. 2). An insulating layer 10 is wound on top. The conducting ribbon is cut so that its last turn comes into contact with the second ring 7.

Another insulating layer 11 is wound on the conducting ribbon at the level of the uncovered part and therefore is superimposed on the insulating layer 10. Then the second sensitive element 4 is cut so that its last turn is applied against the insulating layer 11.

Three metal fixing rings maintain an intimate contact between the windings and provide the electric connections. A first one 12 is in contact with the first ring 6. A second one 13 applies the conducting ribbon 3 against the second ring 7. A third 14 is clamped on the second sensitive element 4 at the level of the insulating layer 10 and 11.

Electric conductors may be welded to the three rings. Depending on the case, rings 12 and 14 are connected directly together so as to place the two sensitive elements in parallel, or else the voltages which they generate are picked up separately between rings 12 and 13 on the one hand and rings 13 and 14 on the other. The two voltages are then applied to amplification and filtering stages (not shown) before being added if required.

In this embodiment, the two sensitive elements are cut across the same cross section and it is the conducting ribbon 3 which is extended as far as the second ring.

In the embodiment shown in FIG. 4, the conducting ribbon 3 is interrupted close to the insulating layer 10 and the second sensitive element is extended so that its last turn comes into contact with the second ring 7. In this case, it is the lower electrode of the second sensitive element 4 which transfers the electric charges from the conducting ribbon 3 to ring 14.

The second embodiment has the advantage of being thinner in its end part. So that the two sensitive elements may have an identical length for providing a better compensation of the parasitic voltages due to the flexional movements of the tubular support, the second sensitive element 4 is symmetrically shortened at the end opposite the sensor device.

Since the intermediate space through which passes the cutting plane 15 between the two secondary rings 7 of the same collector assembly 5 is without any winding, the sensors are fixed to their support (inside a seismic streamer for example) by means of collars (not shown) clamped about the tubular support, at the level of this intermediate space.

Still within the scope of the invention, the two sensitive elements 2, 4 may be wound, with jointing turns, on a tubular support and the windings thus formed fixed edge to edge so as to then be able to remove the tubular support.

What is claimed is:

1. In a pressure wave sensor device of continuous structure of the piezoelectric type having at least two sensitive elements each of which comprises a ribbon formed of a synthetic plastic material having piezoelectric properties and two electrodes disposed on each side of the ribbon, the two sensitive elements being superimposed and disposed in two crossed helical windings, a flexible conducting ribbon, transparent to acoustical waves, wound helically and superimposed on a lower winding of the at least two sensitive elements to overlap lateral edges of all turns of said lower winding, the conducting ribbon providing contact between an external electrode of the sensitive element which the conducting ribbon covers and an internal electrode of a sensitive element which is superimposed thereon.

2. The device as claimed in claim 1, including at least one collector assembly in electric contact with the electrodes associated with the two sensitive elements.

3. In a pressure wave sensor device of continuous structure of the piezoelectric type having at least two sensitive elements each of which comprises a ribbon formed of a synthetic plastic material having piezoelectric properties with two electrodes disposed on each side of the ribbon, the two sensitive elements being superimposed and disposed in two crossed helical windings, a flexible conducting ribbon, transparent to acoustical waves, wound helically and superimposed on a lower winding of the at least two sensitive elements to overlap lateral edges of all turns of said lower winding, the conducting ribbon providing contact between an external electrode of the sensitive element which the conducting ribbon covers and an internal electrode of a sensitive element which is superimposed thereon, and at least one collector assembly in electric contact with the electrodes of the two sensitive elements; said collector assembly including a first conducting strip surrounding the tubular support and at least a second conducting strip, narrower than the first conducting strip, the two conducting strips being superimposed and separated from each other by an insulating layer and the lower sensitive element being in contact with the widest conducting strip.

4. The device as claimed in claim 3, wherein the conducting ribbon is wound on top of the first sensitive element until it comes into contact with the upper narrower conducting strip, the two sensitive elements being interrupted in the same cross section of the tubular support and being superimposed through an insulating layer on the uncovered part of the widest conducting strip, and each collector assembly also includes three rings made from a conducting material in contact respectively with the two conducting strips and an electrode of the external sensitive element.

5. The device as claimed in claim 3, wherein the lower sensitive element and the upper sensitive element are respectively in contact with the lower conducting strip and the upper narrower conducting strip, the conducting ribbon being interrupted close to one end of the lower conducting strip and each collector assembly also includes three rings made from a conducting material in contact respectively with the two conducting strips and an electrode of the external sensitive element.

6. A method for producing a pressure wave sensor device of continuous structure of the piezoelectric type having at least two sensitive elements each formed of a ribbon of synthetic plastic material having piezoelectric properties and associated with two electrodes disposed on each side of the ribbon, the two sensitive elements being superimposed on a support and disposed in two crossed helical windings, which method includes:

the use of a tubular support of great length on which, at even intervals, collecting assemblies are fixed each including a first conducting strip surrounding the tubular support, two second adjacent conducting strips, a part of the first strip, at each of its ends, not being covered by said second conducting strips;

the helical winding, all along the tubular support, successively of the first sensitive element, of the conducting ribbon and of the second sensitive element;

cutting of the tubular element provided with its windings, in the gap between two second adjacent conducting strips;

cutting of the windings at the end of each section, so as to put the electrodes associated with the lower sensitive element in electric contact respectively with a first conducting strip and a second of the conducting strips; and fixing of conducting material rings respectively around the first conducting strip, a second conducting strip and an electrode of the outer sensitive element.

7. The method as claimed in claim 6, including the cutting of the conducting ribbon so that it comes into contact with the second conducting strip, the two sensitive elements being cut to the same length and being placed respectively in contact with the first conducting strip and with a conducting ring.

8. The method as claimed in claim 6, including cutting of the two sensitive elements to unequal lengths, so that they are in electric contact respectively with the first conducting strip and with a second conducting strip, the conducting ribbon being cut in the vicinity of a lateral edge of the first conducting strip.

* * * * *